United States Patent [19]

Nicholson

[11] Patent Number: 5,240,263
[45] Date of Patent: Aug. 31, 1993

[54] METALLIC SEALING RINGS AND THEIR MANUFACTURE

[75] Inventor: Terence P. Nicholson, Hexham, Great Britain

[73] Assignee: Specialist Sealing Limited, Jersey, United Kingdom

[21] Appl. No.: 912,109

[22] Filed: Jul. 9, 1992

Related U.S. Application Data

[63] Continuation of Ser. No. 623,421, filed as PCT/GB89/00595, May 31, 1989, published as WO 89/12189, Dec. 14, 1989, abandoned.

[30] Foreign Application Priority Data

Jun. 1, 1988 [GB] United Kingdom ............... 8812919
Jul. 15, 1988 [GB] United Kingdom ............... 8816923
Mar. 2, 1989 [GB] United Kingdom ............... 8904817

[51] Int. Cl.$^5$ .......................................... F16J 15/08
[52] U.S. Cl. .................................. 277/236; 277/70; 277/167.5; 277/171; 277/205; 277/235 A; 285/336; 285/910; 285/917; 219/137 R
[58] Field of Search ............... 277/205, 206 R, 236, 277/235 A, 88, 167.5, 9.5, 70, 171; 285/917, 910, 336; 427/438; 219/137 R, 75, 86.22, 86.23

[56] References Cited

U.S. PATENT DOCUMENTS

| | | | |
|---|---|---|---|
| 1,223,650 | 4/1917 | Williams | 277/206 |
| 1,567,813 | 12/1925 | Oleson | 277/167.5 |
| 1,695,995 | 12/1928 | Coulston | 277/167.5 X |
| 2,005,587 | 6/1935 | Lorig | 277/88 |
| 2,248,385 | 7/1941 | Reynolds | 277/206 |
| 2,422,009 | 6/1947 | Goetze | 277/70 |
| 2,837,360 | 6/1958 | Ladd | 285/917 X |
| 2,898,000 | 8/1959 | Hanny | 277/236 X |
| 2,940,803 | 6/1960 | Phillips | 277/235 A X |
| 2,975,073 | 3/1961 | De Long et al. | 427/438 X |
| 3,012,802 | 12/1961 | Waite | 277/236 |
| 3,192,690 | 7/1965 | Taylor | 277/205 X |
| 3,197,218 | 7/1965 | Coulter | 277/167.5 |
| 3,325,892 | 6/1967 | Delgodo | 277/205 X |
| 3,520,544 | 7/1970 | Taylor | 277/206 |
| 3,575,432 | 4/1971 | Taylor | 277/206 R X |
| 3,797,836 | 3/1974 | Halling | 277/200 |
| 3,820,830 | 6/1974 | Dryer | 285/336 |
| 4,213,026 | 7/1980 | Duvall et al. | 219/137 R |
| 4,410,186 | 10/1983 | Pierce, Jr. | 277/167.5 |
| 4,452,462 | 6/1984 | Karr, Jr. | 285/336 X |
| 4,676,531 | 6/1987 | Martin | 285/96 |
| 4,779,901 | 10/1988 | Halling | 285/336 X |
| 4,832,353 | 5/1989 | Nicholson | 277/236 X |

FOREIGN PATENT DOCUMENTS

| | | |
|---|---|---|
| 0130867 | 1/1985 | European Pat. Off. . |
| 0241347 | 10/1987 | European Pat. Off. . |
| 2406420 | 8/1974 | Fed. Rep. of Germany ... 277/235 A |
| 2460746 | 7/1976 | Fed. Rep. of Germany ... 277/206 R |
| 550298 | 3/1923 | France ........................... 277/206 |
| 810728 | 3/1937 | France ........................... 277/235 B |
| 817534 | 9/1937 | France ........................... 277/236 |
| 2238098 | 2/1975 | France . |
| 318163 | 8/1929 | United Kingdom . |
| 362689 | 12/1931 | United Kingdom . |
| 444217 | 3/1936 | United Kingdom . |
| 712786 | 7/1954 | United Kingdom ............... 277/236 |
| 927629 | 5/1963 | United Kingdom . |
| 1166855 | 10/1969 | United Kingdom . |
| 1295888 | 11/1972 | United Kingdom . |
| 1311379 | 3/1973 | United Kingdom . |
| 1438735 | 6/1976 | United Kingdom . |
| 1441207 | 6/1976 | United Kingdom . |
| 1538413 | 1/1979 | United Kingdom . |
| 2164401 | 3/1986 | United Kingdom . |
| 2166507 | 5/1986 | United Kingdom . |
| 2190154 | 11/1987 | United Kingdom . |

OTHER PUBLICATIONS

Abstract of European Patent Publication 241,347-A, entitled "Flanged Pipework Connection-Has Collapsible Double-Convex Annular Joint Ring Housed in Conical Recesses", Soc. Ind. Equip. Mec.

Brochure entitled "Gaskets, Also Manufactured and Supplied by the Corrugated Packing & Sheet Metal Company Limited" (date unknown).

*Primary Examiner*—William A. Cuchlinski, Jr.
*Assistant Examiner*—James K. Folker
*Attorney, Agent, or Firm*—Ailes, Ohlandt & Greeley

[57] ABSTRACT

A metallic sealing ring which in radial cross-section is hollow and of sinuous profile having axial end faces sinuously curved so as each to define an axially outward facing deep peripheral groove, the interior of the ring profile being in communication with the exterior thereof.

13 Claims, 10 Drawing Sheets

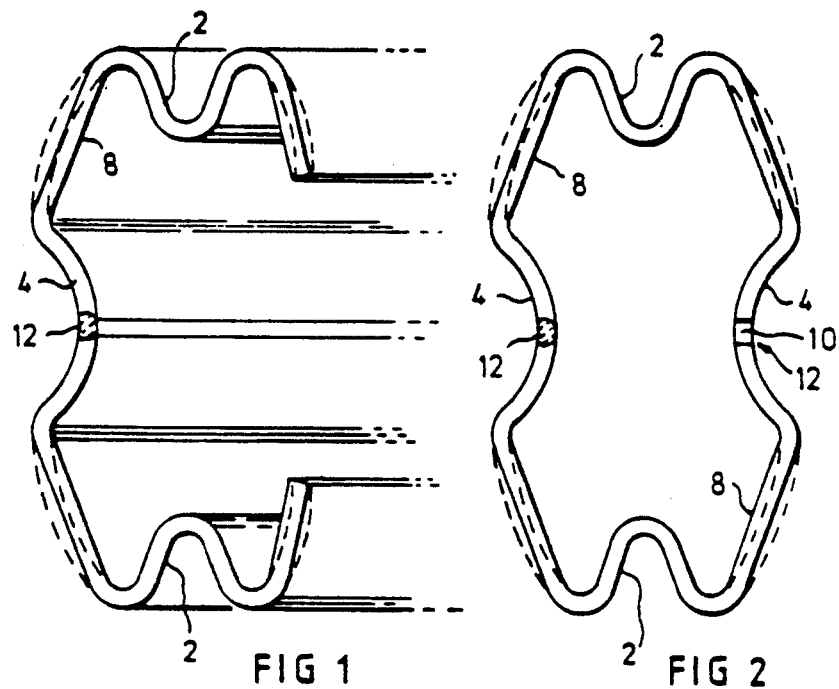
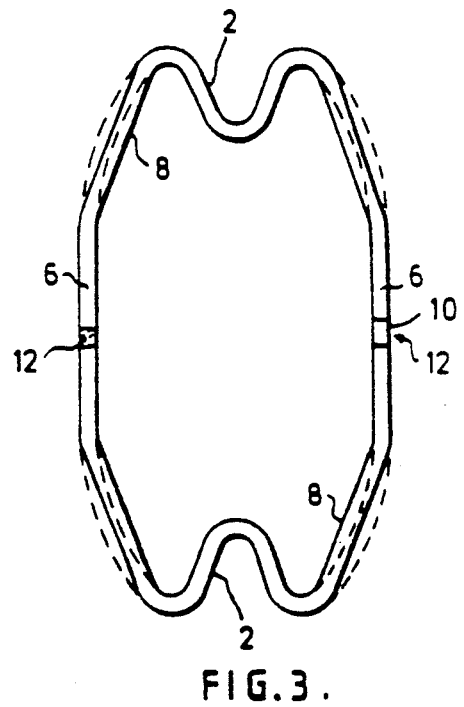

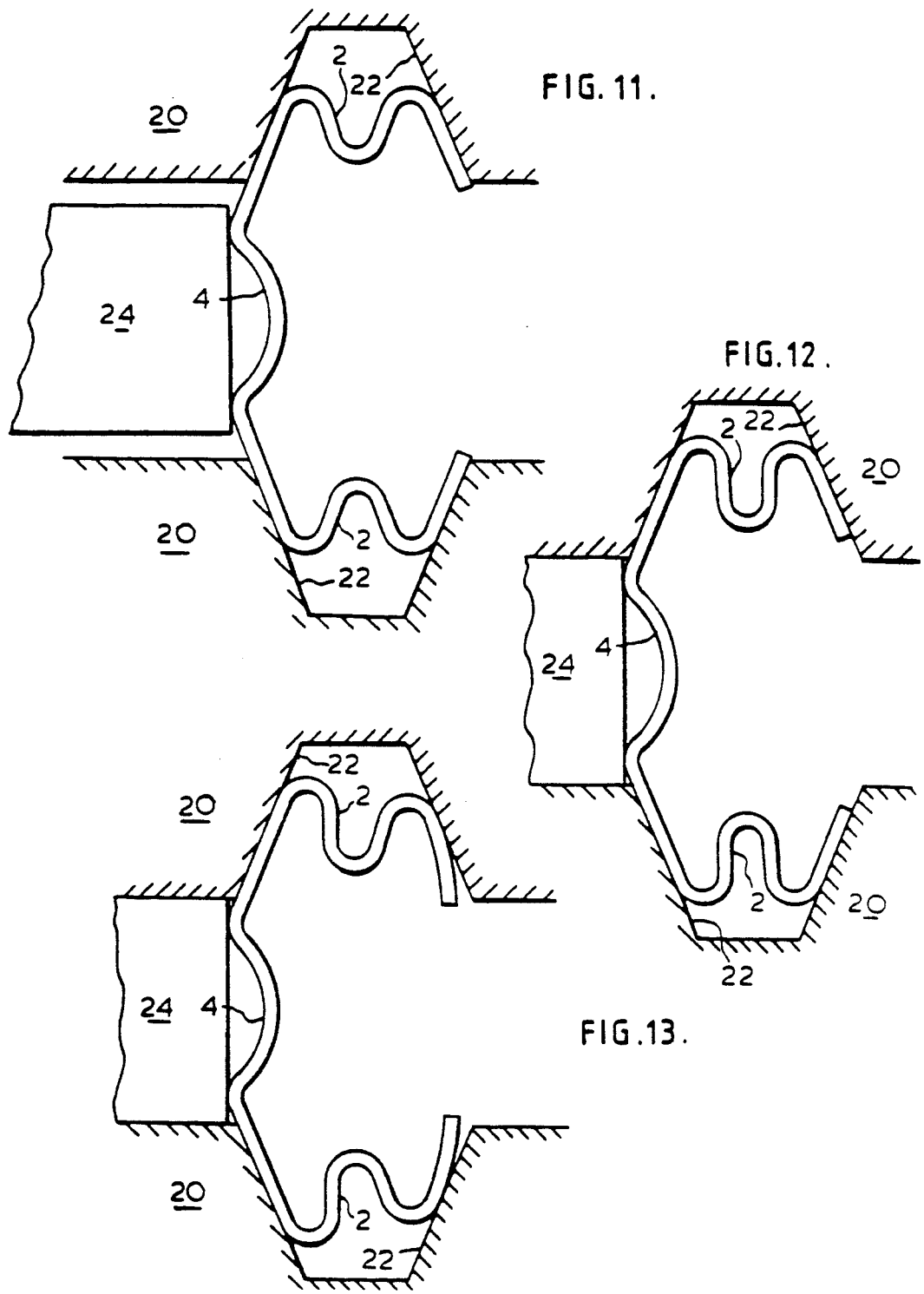

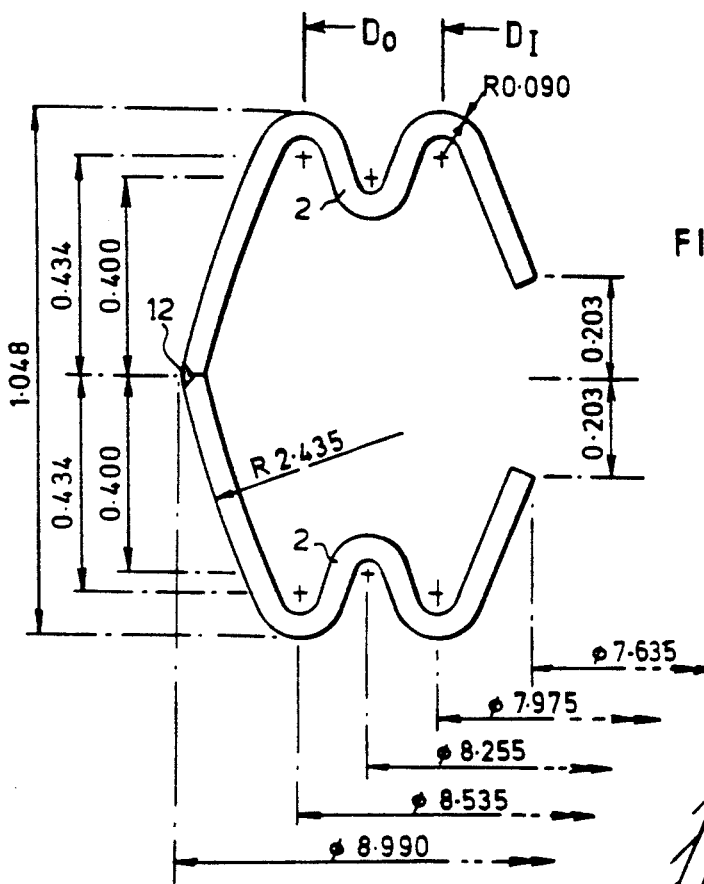
FIG.21.
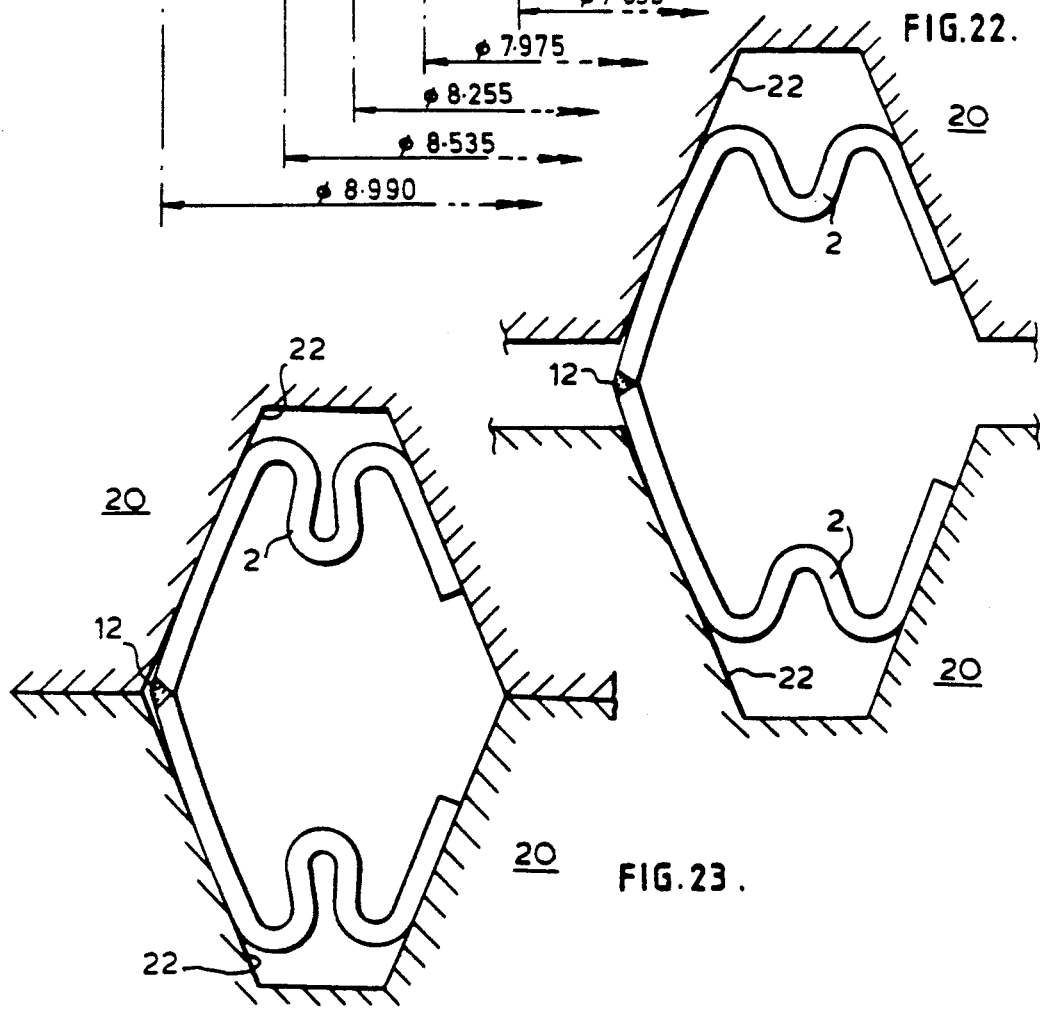
FIG.22.
FIG.23.

METALLIC SEALING RINGS AND THEIR MANUFACTURE

This is a continuation of application Ser. No. 07/623,421, filed as PCT/GB 89/00595, May 31, 1989, published as WO 89/12189, Dec. 14, 1989, abandoned.

This invention relates to metallic sealing rings for sealing the joints between opposed parallel surfaces such as for instance, and in particular, the end flanges by which pipe lengths are connected together by means such as studs, bolts and nuts, and to the manufacture of such rings.

The invention relates particularly, but not exclusively, to sealing rings capable of providing an improved alternative to the use of metallic sealing rings, i.e. gaskets, which are of solid mult-sided radial cross-section as currently specified by the American Petroleum Institute (API) for sealing pipeline flange joints by location in opposed grooves in the flange faces. The standard groove cross section is a symmetrical trapezium.

BACKGROUND OF THE INVENTION

In such applications leakage problems arise from time to time and particularly in the conveyance of gases at high pressure. In the main this is not primarily due to faulty design of the sealing rings but to the difficulty of ensuring that machining of the joint components is of a sufficiently high standard regardless of where they have been manufactured.

The leakage problem is particularly acute when the flanges are intended to be drawn into face to face abutment instead of slight spacing or stand-off. There are many situations where it is essential to have face to face assemblies.

SUMMARY OF THE INVENTION

In accordance with one aspect of the present invention there is proposed a metallic sealing ring which in radial cross-section is hollow and of sinuous profile having axial end faces sinuously curved so as each to define an axially outward facing deep peripheral groove, the interior of the ring profile being in communication with the exterior thereof.

One or each radial face of the ring may be curved to define a laterally facing shallow arcuate profile groove. However, this is not satisfactory in all working environments because there is a tendency when an abnormal or excessively high pressure is applied to the system, for instance in a blow-out or explosive situation, for a radially outward groove not only to flatten out, but to become outwardly convex tight into a corner formed between adjacent parts of grooved pipe flanges between which the metallic sealing ring is received, this can cause movement at the high pressure sealing areas of the seal which can initiate a leakage problem.

To provide a metallic sealing ring which can function efficiently even when subjected to excessively high pressures as aforesaid, one or each of its side walls is curved to define a radially outwardly directed shallow convex configuration in the region of the intended abutment or near abutment of the surfaces which are to be sealed.

The radial cross-section may be of closed hollow formation or alternatively a hollow formation which is open on one—and preferably its radially inward—side. If the hollow formation is closed the ring will be formed with a normally radial vent hole, to transmit operating fluid pressure to the interior of the ring cross section so that in this configuration, as in the open configuration, the seal is self-energised by the fluid pressure acting on the internal surface of the cross section of the ring.

According to another aspect of the invention there is provided a metallic sealing ring which in radial cross-section is hollow, at least one of its radially inner and outer side walls being curved to define a concave shallow arcuate groove, the interior of the ring being in communication with the exterior.

It is therefore another aim of the present invention to provide a metallic sealing ring which overcomes or at least alleviates these problems, and in particular a metallic sealing ring which can provide an effective seal which is not prone to scuffing.

According to this aspect of the present invention, there is provided a metallic sealing ring which in radial cross-section is hollow, the metallic sealing ring comprising a pair of limbs which are joined together at one end and are contiguous with respectively inwardly curved portions at their other end, where the inwardly curved portions each extend at least as far as a contact point for contacting a sealing surface.

In a preferred embodiment the inwardly curved portions extend beyond the contact points so that their free ends are directed towards the interior of the sealing ring. In this case, the metallic sealing ring may be configured such that the free ends contact one another when the seal is under compression thereby enhancing the effectiveness of the seal between the contact points and surface to be sealed.

A seal according to this aspect of the invention has the advantage that as the metallic sealing ring undergoes compression, the profile of the seal changes in such a manner that sliding movement between the contact point of the inwardly curved portion and the surface to be sealed does not occur. Scuffing is therefore eliminated and so any nickel coating present on the metallic sealing ring and/or on the surface of the member to be sealed is maintained, the effectiveness of the seal thereby maintained.

The non-sliding contact between the inwardly curved portions of the metallic sealing ring and the sealing surface is achieved by virtue of the face that the inwardly curved portions undergo a rolling action under compression. That is to say the point of the inwardly curved portion contacting the sealing surface moves together with the sealing surface as the compression takes place. This action will be described in greater detail below with reference to the accompanying drawings.

A gap must exist between the limbs in seals embodying this aspect of the invention for the rolling action to occur otherwise the rolling action is restricted. The gap is present when the sealing ring is in its relaxed state and during most or all of the compressive stages of the sealing ring.

In an embodiment where the limbs contact one another at the last stage of compression, the contacting of the limbs serves to push the soft plating or nickel coating of the inwardly curved portions against respective surfaces of the member to be sealed thereby ensuring the integrity of the seal at the contact points. This also serves to fill in any surface asperities or irregularities in the surfaces of the member to be sealed. This is achieved without restricting the rolling action provided that the limbs only contact one another during the last part of the compression movement. Seals embodying this aspect of the invention could be referred to as "rolling seals".

The fact that the seal performs the rolling action means that apart from avoiding the occurrence of scuffing, the seal also adjusts to accommodate dimensional variations in the grooves, which dimensional variations may result from manufacturing tolerances.

In a preferred embodiment of this aspect of the invention, at least part of each limb which is also configured for contacting a sealing surface of a respective groove is coated with low friction material. This material may be selected from silver, gold or PTFE or other low friction material of which there are many and well known in the art.

Embodiments are particularly suited for use in both R and RX A.P.I. grooves. When a metallic sealing ring embodying this aspect of the present invention is used in association with such a groove, a non-scuffing seal is established between respective contact points of the inwardly curved portions and a side of respective opposing grooves. A sliding seal is established between the portion of the limbs having the low friction material and the other side of the grooves. Use of the low friction material reduces the possibility of scuffing which may result from the sliding movement between the limbs and the outer sides of the groove.

In alternative embodiments the inwardly curved portions may extend beyond the contact point so that their free ends face one another. Alternatively, between the contact point and the free end, the seal may be straight in profile. In either case, the part of the metallic sealing ring beyond the contact point will serve to strengthen the seal so that the seal can withstand higher compression forces.

The inwardly curved portions of the metallic sealing ring may be of constant radius, although this is not essential.

The limbs may be straight or curved in profile. The limbs are preferably joined together by means of a weld joint.

Embodiments of this aspect of the present invention are preferably self-energizing in nature. In the event that metallic sealing rings embodying the invention are configured so that the free ends of the inwardly curved portions contact one another under compression communication means is provided for connecting the interior of the sealing ring with the exterior. This permits equalization of pressure between the interior and exterior of the ring so that high pressure gas can serve to enhance the sealing contact between the metallic sealing ring and the grooves of the flanges. The communication means may be in the form of openings provided in the inwardly curved portions or may be in the form of grooves extending along the curved portions at or near to the free ends.

For some applications it is desirable and advantageous to pre-compress the sealing ring before it is installed. This can substantially enhance the performance of the sealing ring. Typically, the sealing ring is pre-compressed to approximately one half of the normal compression to be applied in use. The nominal full compression is typically about 15%.

Preferably, the sealing ring consists of two annular half-seals each forming one axial half of the radial cross section of the sealing ring, these half-seals being welded together along a circumferential weld line or lines, with each half-seal being pressed before welding, to a form corresponding to about one half of the nominal compression in use.

Some preferred embodiments of the invention are hereinafter described with reference to the accompanying drawings in which FIGS. 1 to 31 without exception comprise radial cross-sections of the now proposed sealing rings for use with pipe flange joints.

BRIEF DESCRIPTION OF THE DRAWINGS

FIG. 1 is a hollow sealing ring according to the present invention which is open on its radially inward side;

FIGS. 2 and 3 are hollow sealing rings according to another embodiment of the present invention which are closed and formed with vent holes on their radially inner sides;

FIGS. 11 to 13 illustrate successive stages in the formation of a spaced or stand-off joint between pipe flanges using the sealing ring of FIG. 1;

FIG. 21 depicts the sealing rings of FIG. 14 having an external surface which forms an angle at the weld line;

FIGS. 22 to 24 illustrate the behavior of the ring shown in FIG. 21 when clamped in grooves of top and bottom tolerances;

FIGS. 1 to 3 illustrate three different configurations of sealing rings to be used as an alternative to a ring section known as "RX" under the American Petroleum Institute. (API), classification. Each ring is hollow but whereas the FIG. 1 ring is open on its radially inward side the rings of FIGS. 2 and 3 are closed and formed with vent holes 10 on their radially inner sides. All the rings have circumferential median weld lines 12, at which two pre-formed half-seals are united in a plane perpendicular to the seal ring axis.

Figure 4:
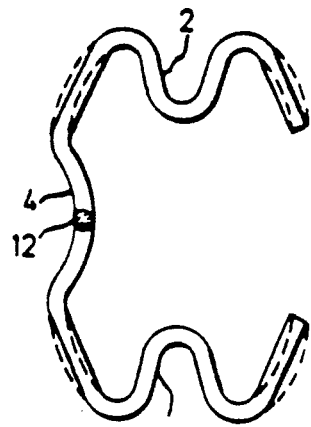
FIGS. 4 and 5 show two further ring configurations having a lower ratio of axial to radial dimensions.

All three rings are of sinuous radial profile and are characterised by having opposite-facing corrugated formations which constitute axially outwardly facing deep peripheral grooves 2 in the axial end faces of the rings.

Additionally, one or each side wall of the ring profile may have a laterally facing shallow arcuate concave profile forming a groove 4. In the case of the ring illustrated in FIG. 1 which has an open profile, the groove 4 is in the radially outer side. The ring illustrated in FIG. 2 which has a closed profile has grooves 4 in both the radially inner and radially outer sides.

The ring illustrated in FIG. 3, which has a closed profile, does not have grooves 4 but instead has rectilinear axially extending radially inner and outer walls 6 between the respective sinuous end regions.

The grooves 4 provide enhanced resilience and flexibility under compression.

The form of seal in FIG. 1, completely open on the inner face with its annular groove around the outside diameter, is extremely flexible compared with the form in FIG. 2 which is totally enclosed with the inner and outer annular grooves and the vent hole/holes which makes it substantially stronger, i.e. requiring much higher clamping loads. The seal of FIG. 3 would be even stronger, because of the lack of the annular grooves 4. This is to cope with higher pressures.

In the illustrated rings, the side walls and end regions are interconnected by obliquely extending rectilinear regions 8. Alternatively, these regions may be of curved cross-section, as shown in broken lines in the drawings, it has been established by test that the curved faces are operationally superior.

Figure 5:
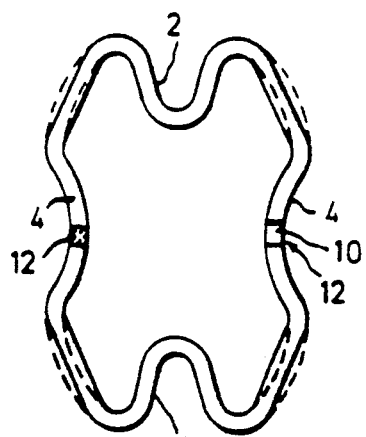

FIGS. 4 and 5 show two further ring configurations having the same characteristics as have been mentioned above but which are intended as improved alternatives to what are known as type "R" ring seals or gaskets according to the API classification and therefore have a lower ratio of axial to radial dimensions.

Figure 6:
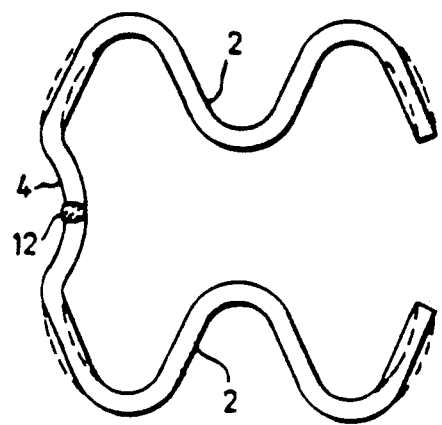
FIGS. 6 and 7 show two additional ring configurations having lower ratios of axial to radial dimensions than FIGS. 4 and 5, above.
Figure 7:
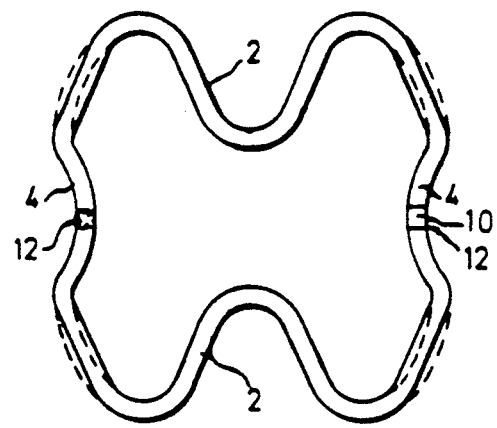

Similarly, FIGS. 6 and 7 show two further possible ring configurations having the same characteristics as have been mentioned above but which are intended as improved alternatives to what are know as type "BX" ring seals or gaskets according to the API classification and therefore have a still lower ratio of axial to radial dimensions.

In each of FIGS. 4 to 7 inclusive also, there are indicated by dashed lines alternative radiused portions between the deep axial groove formations 2 and the shallow lateral grooves 4.

Figure 8:
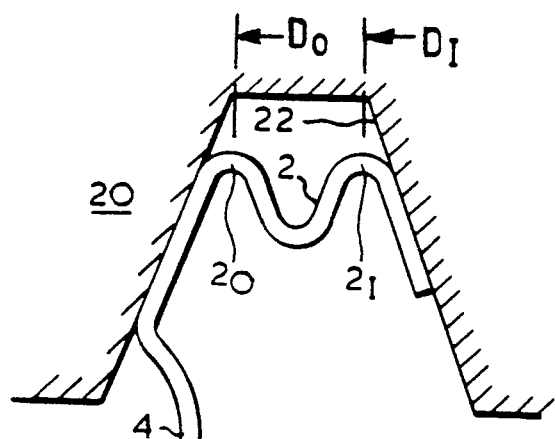
FIGS. 8 to 10 depict the stages in the formation of a sealed joint between two grooved pipe flanges using the sealing ring of FIG. 1.
Figure 9:
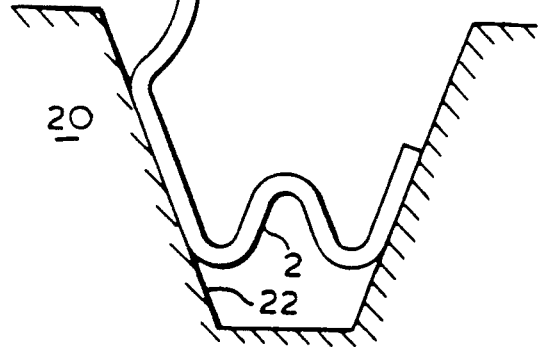
Figure 10:
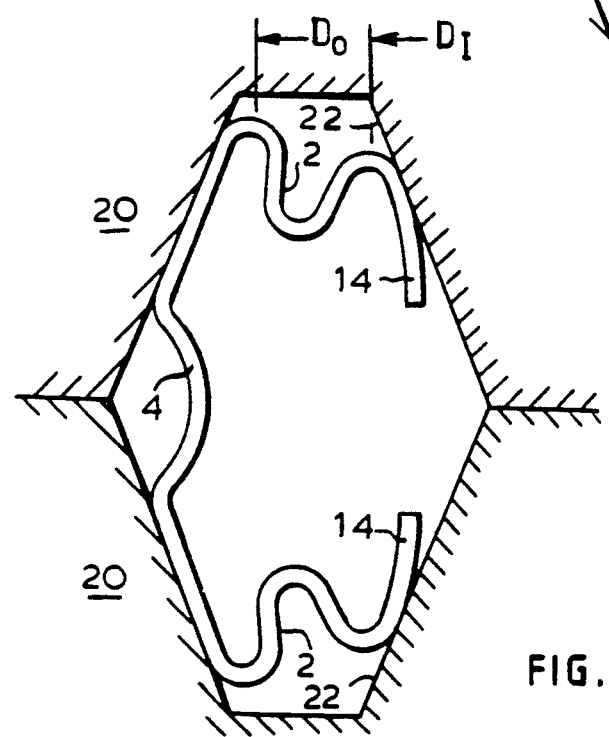

FIGS. 8, 9 and 10 stages in the formation of a sealed joint between two grooved pipe flanges 20 using a sealing ring with the FIG. 1 radial configuration are illustrated, in fragmentary cross-section.

It is to be understood that each of the flanges 20 is an annular external flange provided on the end of a pipe. In the axially outwardly facing surface of the flange is a coaxial annular groove 22 of trapezoidal cross-section as specified by the API, so that when two such flanges are assembled face to face, the respective grooves in their surfaces together form an annular cavity of hexagonal cross-section accommodating the sealing ring.

FIG. 8 shows the positions of the flanges and sealing ring assembled together with the sealing ring seated in the respective grooves, before the flanges have been drawn together, and with the sealing ring in its natural uncompressed condition.

In use, the flanges are brought together, for example by means of bolts or clamps, into a stand-off configuration or, as illustrated in the drawings, into face to face contact.

This compresses the interposed sealing ring. Typically, for components having the nominal dimensions, the degree of compression is about 15%.

The grooves 22 are machined into the flange faces. Inevitably, manufacturing tolerances lead to variations in the groove dimensions. These variations affect the interaction between the side walls of the grooves, and the sealing rings trapped between them, thereby creating a major difficulty in establishing a true face to face set-up with conventional API rings of solid cross section.

FIG. 9 illustrates the position taken up by the sealing ring when the flanges have been brought into face to face contact, in a situation in which one or other of the grooves has been machined to the upper tolerance limit, that is to say, to the maximum internal dimensions and therefore minimum compression of the sealing ring. As shown in FIG. 9, in these conditions the compression of the sealing ring is expressed primarily by lateral contraction of the groove formations 2.

FIG. 10 illustrates the position taken up by the sealing ring under full compression, when one or other of the grooves has been machined to the lower limit of tolerance, that is to say, to the minimum internal groove dimensions. In this situation, the compression of the sealing ring is expressed primarily by deflection of its inner limbs 14, axially towards one another. It will be seen that in this configuration as well as in that illustrated in FIG. 9, there is ample sealing contact between the sealing ring and the groove walls.

The present seals have been designed to have sufficient strength to cope with the high torque loadings and pressures associated with OIR equipment, yet at the same time having sufficient flexibility to adjust in dimension to satisfy the variation in groove dimensions due to manufacturing tolerances to which these groups are machined.

When the seal is fitted into the grooves and the flanges clamped together, the diameter $D_O$ of the outer corrugation crest $2_O$ is forcibly reduced in dimension and the diameter $D_I$ of the inner corrugation crest $2_I$ is forcibly increased in dimension. This results in an extremely high loading force between the inner and outer diameters of the seal and the sloping faces of the grooves. This is the reason for the grooves 2 which permit the diameters $D_O$ and $D_I$ to adjust independently to suit either of the sloping faces of the groove.

The depth of the annular groove 2 in each of the two annular faces is selected to suit the degree of variation between the two diameters and the variation in the dimensions of the groove in which the seal is to be compressed. This is in conjunction with the thickness of metal from which the seal is manufactured. Briefly, if the groove is too deep it is possible for the metal on the inside of the seal to fracture, whereas if the groove was only a gentle undulation, it would act as a rigid strut which would reduce its flexibility to almost nil.

FIGS. 11, 12 and 13 illustrate successive stages in the formation of a spaced or stand-off joint between pipe flanges, again utilising a sealing ring with a configuration as indicated in FIG. 1. By comparison with the joint illustrated in FIGS. 8, 9 and 10 the grooves 26 in the flanges are shallower, and compression of the sealing ring and final spacing between the flanges is determined by an interposed pressure control ring 24.

FIG. 11 illustrates the position of the components before compression while FIGS. 12 and 13 illustrate the configuration of the sealing ring under top tolerance and bottom tolerance conditions effectively.

Preferably, but not essentially, the control ring 24 is of an internal diameter such as to provide a close fit adjacent the outermost diameter of the flange grooves 26 and sealing ring. It will be seen that the radially inner face of the control ring 24 is at all times in contact with the radially outermost portions of the seal ring. This overcomes any possibility of the sealing being forced outward and being nipped between the flanges which could cause it to fracture.

The described seal rings have been found to work extremely well and to provide more reliable sealing and greater accommodation of groove machining tolerances, than the solid-section sealing rings which have hitherto been used a standard components under API requirements. However, in some circumstances the recess 4 in the radially outer wall may be blown outwards, under conditions of very high internal pressure, and this can impair the sealing action, as already explained this is due to movement of the seal during this reaction.

To avoid the problem of the groove 4 being flattened or forced outwards into the angle formed by the radially outer walls of the grooves in a joint made with face to face contact, the groove 4 may be omitted, the outer face of the sealing ring being, instead, radiused or angled in cross-section.

Figure 14:
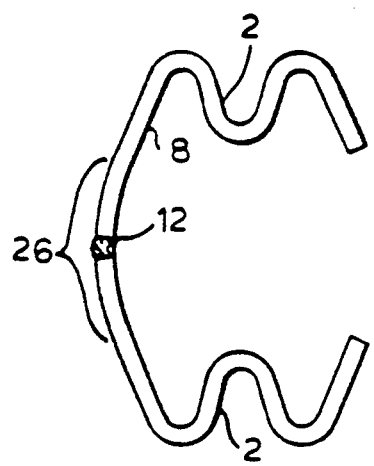
FIGS. 14 to 17 illustrate two different configurations of sealing rings.
Figure 16:
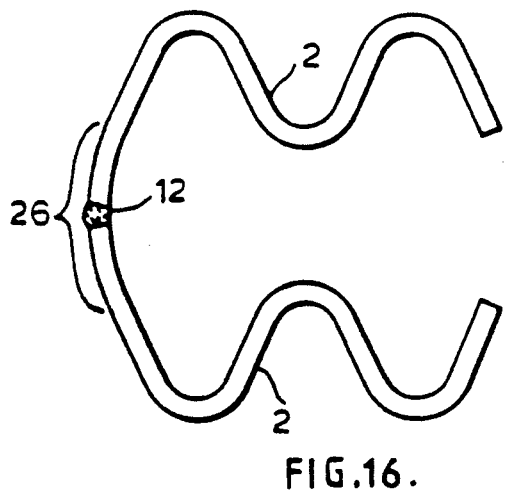
Figure 17:
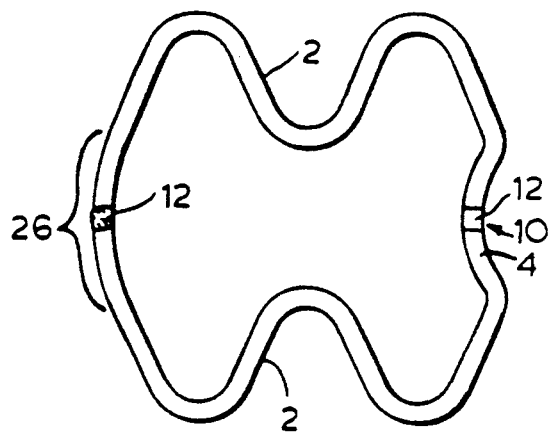
Figure 18:
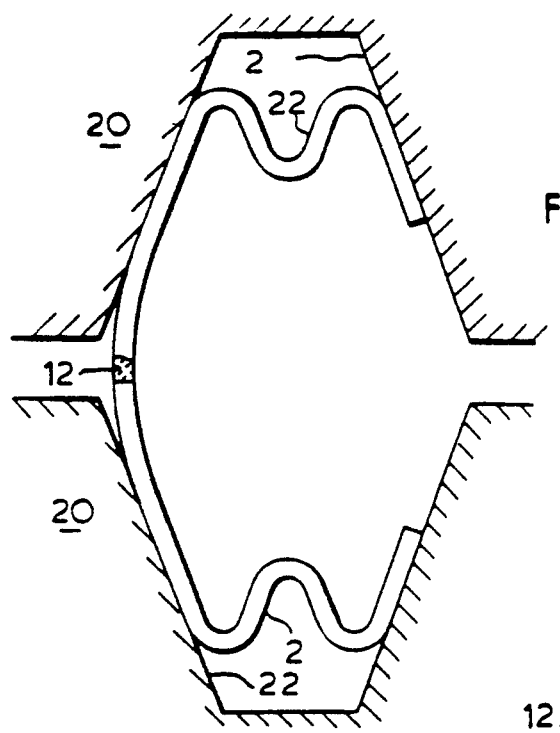
FIGS. 18 to 20 illustrate stages in the formation of a sealed joint between two grooved pipe flanges using the sealing ring of FIG. 14.
Figure 19:
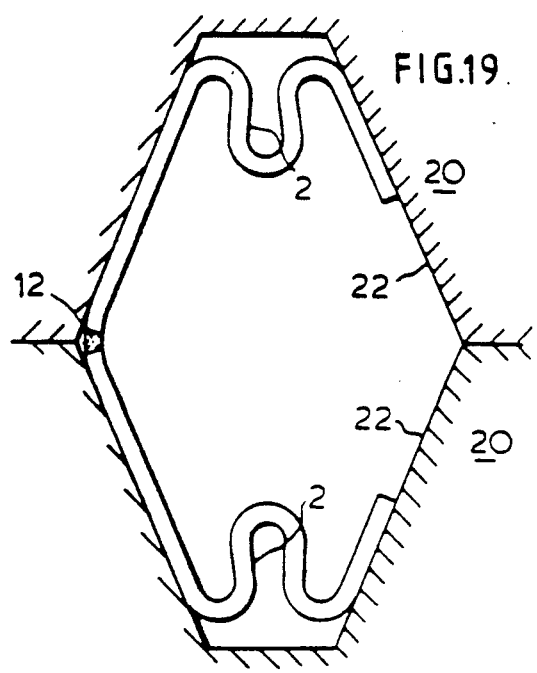
Figure 20:
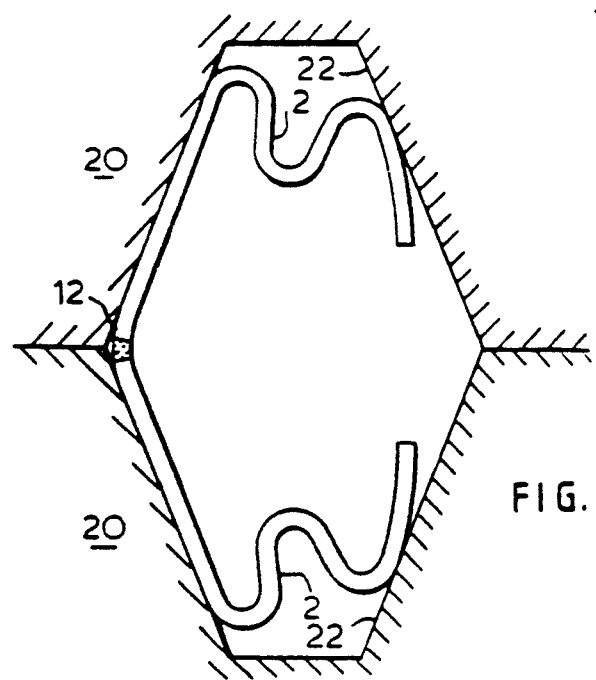

Accordingly, FIG. 14 to 17 illustrate two different configurations of sealing rings to be used as an alternative to a ring section known as "RX" under the American Petroleum Institute, API, classification; i.e. that is 'R' section and BX section rings; and FIGS. 18 to 20 illustrate stages in the formation of a sealed joint between two grooved pipe flanges using a sealing ring as illustrated in FIG. 14.

Figure 15:
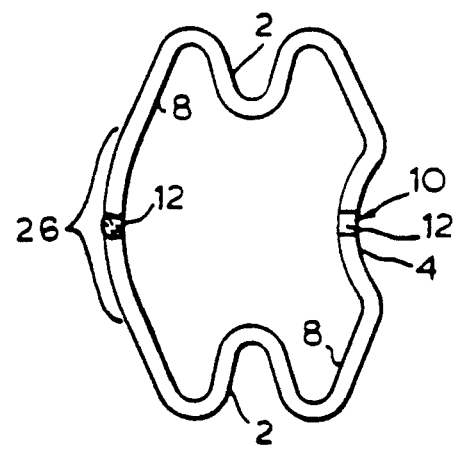

Each of the rings shown in FIGS. 14 to 17 in radial cross-section in hollow but whereas the rings of FIG. 14 and FIG. 16 are open on their radially inward side, the rings of FIGS. 15 and 17 are closed and are formed with vent holes 10. All the rings are formed with weld lines 12.

All four rings are of sinuous radial profile and are characterised by opposite-facing formations 2 which constitute axially outwardly directed deep peripheral grooves in the axial end faces of the rings.

Additionally each ring is characterised in that its radially outward wall is curved to define a radially outwardly directed shallow convex configuration 26 in the region of the intended abutment or near abutment of the surfaces which are to be sealed. Also the closed profile hollow rings shown in FIGS. 15 and 17 are formed on their radially inward side with a shallow concave portion or groove 4.

In FIGS. 18, 19 and 20 stages in the formation of a sealed joint between two grooved pipe flanges 20 using a sealing ring with the FIG. 14 radial configuration are illustrated.

These rings can be used in a stand-off joint, but it is essential to incorporate a compression control ring to prevent the seal being destroyed by over compression.

FIG. 18 illustrates the position of the components before the flanges have been drawn together into contact and before the sealing ring is compressed.

FIG. 19 illustrates the position taken up by the sealing ring when the flanges have been brought to face to face contact in a situation where one or other of the flange grooves 22 has been machined to the limit of upper tolerance, whereas FIG. 20 illustrates the final position of the sealing ring under compression when one or other of the grooves has been machined to a bottom limit of tolerance.

It will be seen from these drawings that under normal operating conditions, the sealing action of the sealing rings illustrated in FIGS. 14 to 20 is similar to that of the rings illustrated in FIGS. 1 to 13. However, under excessive internal pressure, because the outermost surface of the sealing ring is already convex, the pressure can cause only minimal movement of the sealing ring, insufficient to disturb the sealing contact between the sealing ring and the groove walls.

A minor disadvantage is that the absence of the groove or recess in the radially outer wall of the sealing ring reduced the compliance of the sealing ring to some extent, so that it is somewhat less able to accommodate large groove machining tolerances than the rings illustrated in FIGS. 1 to 13, but provided that the grooves are within tolerance there is no problem.

Figure 24:
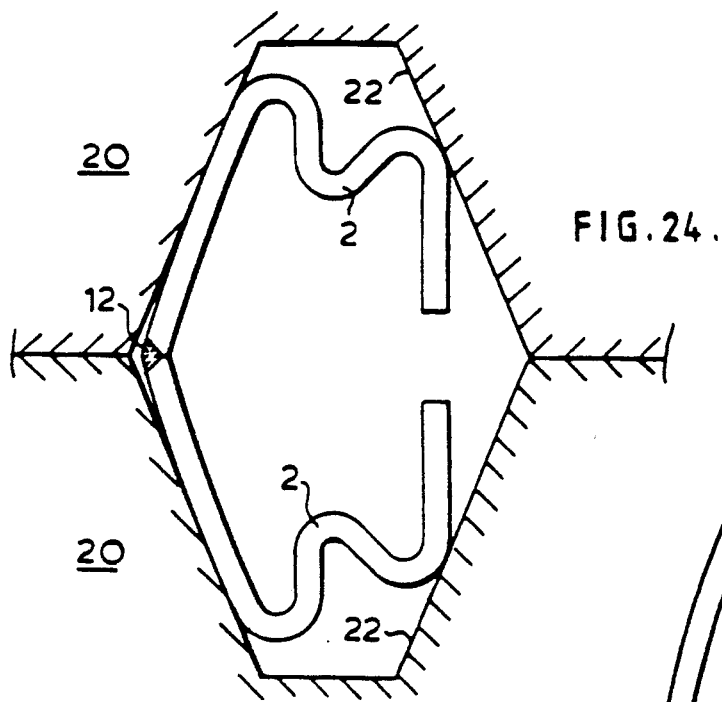

The sealing rings illustrated in FIGS. 14 to 20 have smoothly curved convex external surfaces. Alternatively, the external surface may form an angle at the weld line 12 as shown in FIG. 21, which illustrates a ring otherwise similar to that illustrated in FIG. 14. FIGS. 22 to 24 illustrate the behaviour of this ring when clamped in grooves of top and bottom tolerances, analogous to FIGS. 8 to 10 and FIGS. 18 to 20. FIG. 21 shows dimensions in inches of a seal ring equivalent to an RX46 seal, by way of example only. Other seal sizes would have generally proportionate dimensions.

FIGS. 25 to 28 are corresponding drawings, illustrating a sealing ring intended for use at higher pressures, in the range 5 to 10 thousand PSI. This ring has a configuration generally resembling that of FIG. 15, but with an angle at the external weld line 12, and a relatively deep groove or recess 4 in its radially inner surface.

A sealing ring of this configuration has enhanced ability to accommodate tolerances in the machined groove dimensions, enhanced inherent restoring force, and enhanced radial and axial hoop stresses in operation. It provides increased contact and therefore sealing pressure at the contact positions between its inner limb 16 and the groove walls. The inner groove 4 acts as a compression restricting means, to increase the contact load between the seal and the groove.

Figure 25:
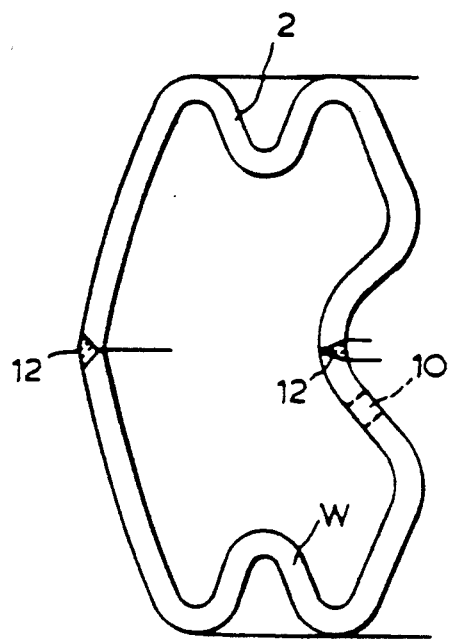
FIGS. 25 to 28 illustrate a sealing ring intended for use at higher pressure.
Figure 26:
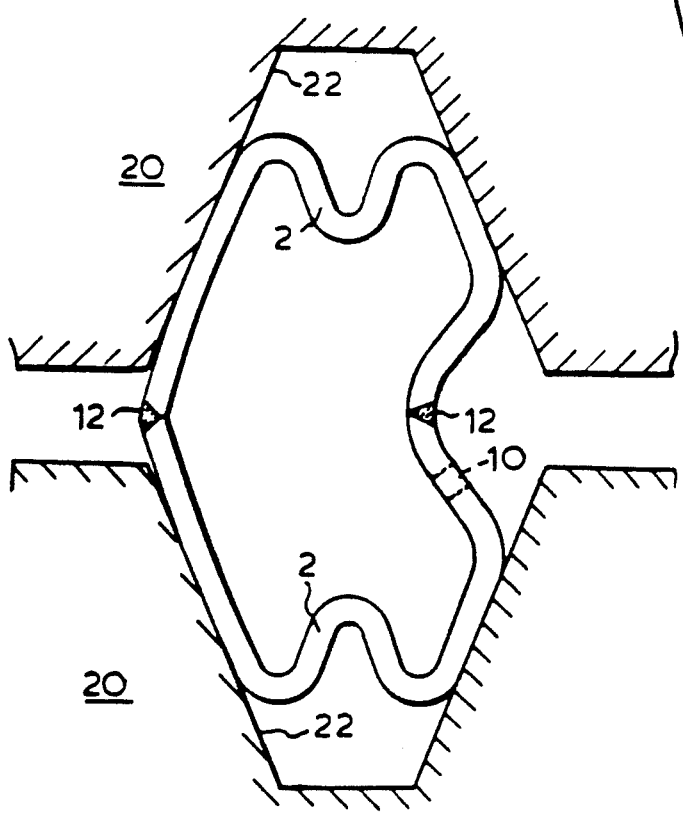
Figure 27:
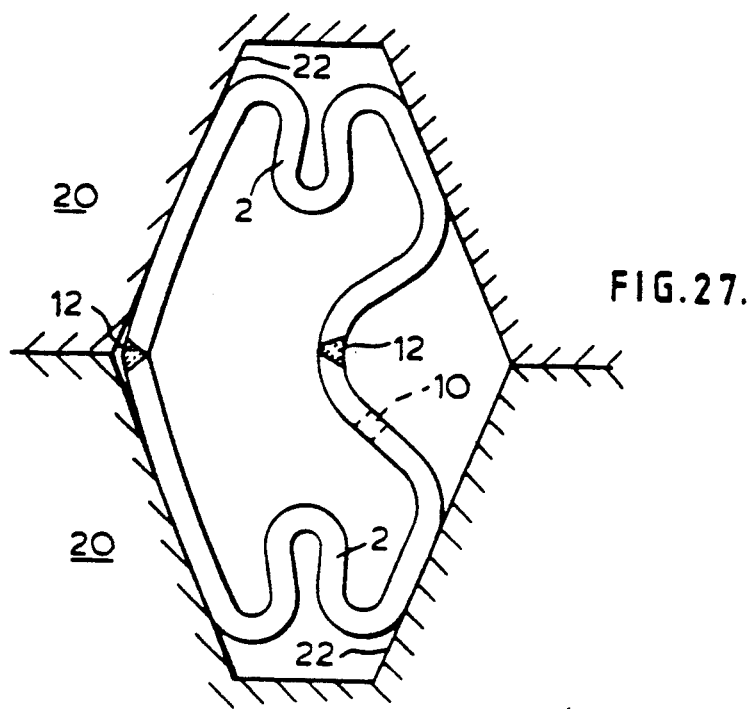
Figure 28:
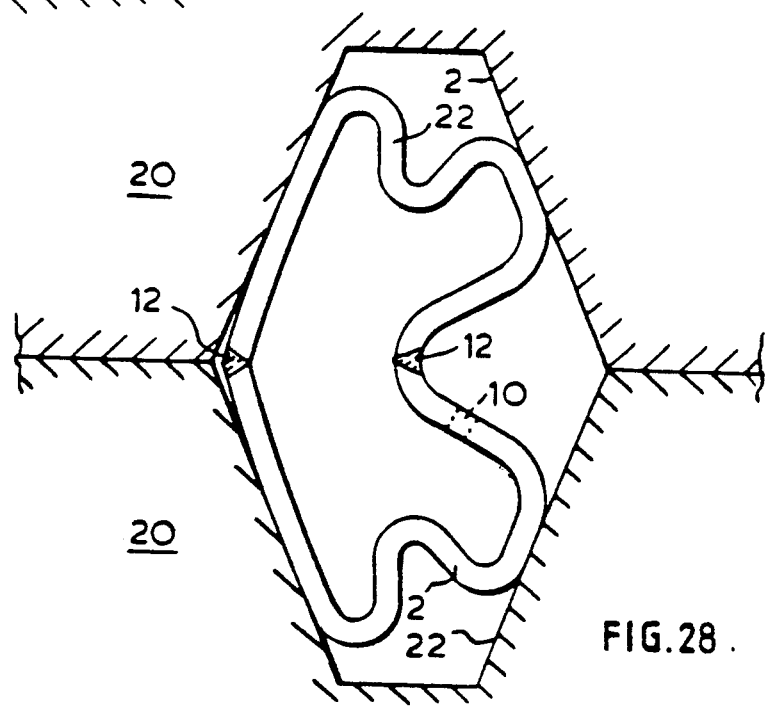

FIGS. 25 to 28 also illustrate vent holes 10 placed in the side regions of the inner groove or recess 4, instead of at the centre of this recess as illustrated in FIG. 15. By placing the vent holes as shown in FIG. 25, the effect of these on the strength and stiffness of the sealing ring is minimized.

The seals of FIGS. 14 to 28, because of the absence of groove 4 on the exterior surface, are even stronger than that of FIG. 2, requiring higher fluid pressures and rougher machined faces.

Figure 29:
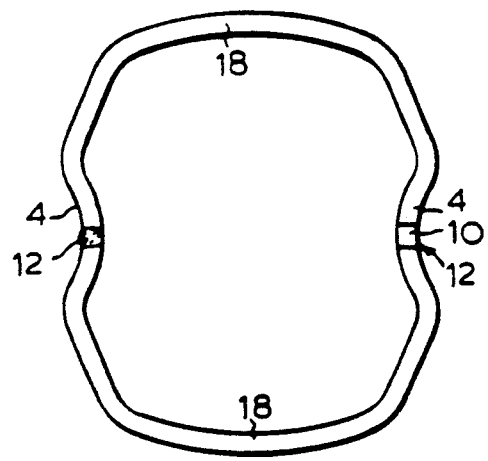
FIGS. 29 and 30 illustrate a further configuration of hollow metal sealing ring.
Figure 30:
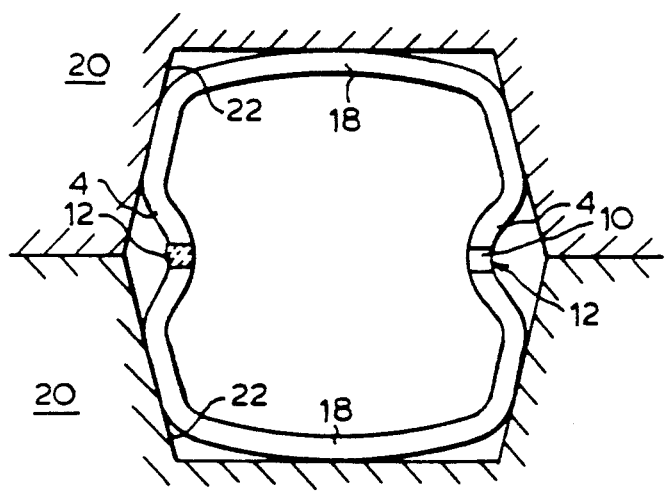

FIGS. 29 and 30 illustrate a further configuration of hollow metal sealing ring, intended primarily but not exclusively to be used in place of the solid-section sealing rings currently specified by the API.

In FIG. 29 there is illustrated an alternative type BX ring wherein, instead of the deep grooves 2, the pressure receiving axial facing parts 18 of the ring are slightly outwardly convex.

This sealing ring is of closed cross-section, having grooves or recesses 4 in both its radially inner and radially outer faces, to provide the necessary self-energising spring action and ability to accommodate groove machining tolerances. FIG. 30 shows this sealing ring under compression.

The ring illustrated in FIGS. 29 and 30 has, a closed cross-section with a groove or recess in at least one of the radially inner and outer surfaces, in particular the radially inner surface, to provide self-energisation under compression, and ability to accommodate groove tolerances.

It must be noted that these seals are self-energising. This means that once the seals are clamped up and the system is pressurised, the fluid under pressure acts on the internal faces of the seals and forces the sealing faces of the seal even more firmly to the sloping faces of the groove, ensuring that the seal functions even more securely.

The illustrated seals are made by initially pressing two mirror-image half-seals from sheet metal, corresponding respectively to the upper and lower halves of the illustrated sealing rings. These pressed half-seals are then welded together along the circumferential weld line or lines 12, after being machined if necessary. After welding, the sealing ring is, if necessary, polished and plated.

In all instances the thickness of the metal of the sealing ring is adjusted to suit both the pressure to be applied and the size of the radial section.

The sealing rings can be manufactured in any metal but for almost all applications the rings are intended to be produced in stainless steel or the high nickel alloy Inconel (Trade Mark). A nickel or nickel-rich coating may be applied to avoid corrosion. Inconel "718" is particularly specified for sub-sea so-called "sour well" applications but requires an aging treatment to convert it to the specification approved by the North American Corrosion Engineers.

Other coatings such as silver, gold, copper, lead and PTFE can be used for other applications.

Prior to applying a 0.25 mm nickel coating for "sour well" applications, the rings are vacuum age hardened to increase the spring characteristics as well as to increase the corrosion resistance of the Inconel (Trade Mark) ring. The ring is then polished, vacuum heat treated for 4 hours at 700° C. to anneal the nickel and then re-polished.

Modifications may be made to the embodiments described above without departing from the scope of the present invention. In particular, the nickel coating need not be applied to the sealing ring in the event that the seal is to be used in non-corrosive environments. Also, the specific dimensions of the seal can be adjusted depending upon the groove in which the seal is to be employed.

It has been found in practice that for "sour well" used coatings such as silver, lead and PTFE should be avoided wherever possible and that nickel is usually essential to avoid corrosion.

With nickel-coated rings, problems can arise if the grooves also have surfaces of nickel, or nickel-rich surfaces, for example of Inconel 718 to avoid corrosion in the grooves. Because of the relative sliding between the tapered sides of the groove and the surface of the seal ring, and the similarity of the materials of these surfaces, serious scuffing or galling between the groove surface and the sealing ring occurs.

It has been found that this problem can be overcome, and other advantages can be obtained, if the sealing ring is shaped before use, to a shape corresponding to that which it would adopt if compressed to a degree less than the nominal degree of compression in use. Preferably the ring is or its components are pre-compressed, preferably to about one half of the nominal compression, which is typically about 15%.

Preferably, the sealing ring consists of two half-rings welded together along a circumferential weld line, for example as shown at 12 in FIG. 1, and each of the half-seals is axially compressed after initial pressing to shape and before welding, by about one half of the nominal compression in use.

It has been found that pre-compression of the sealing rings can not only reduce or eliminate problems of scuffing or galling between nickel or nickel-rich surfaces, but can also increase the strength and performance of the seal irrespective of the nature of the seal and groove surfaces.

A preferred method of manufacture is as follows.

Two mirror-image half seal rings of stainless steel or Inconel are pressed to the appropriate corrugated cross section, corresponding for example to the upper and lower halves of the sealing ring shown in FIG. 21. Additional compression is then applied so that the final form of the pressed half seal corresponds to the form of the basic sealing ring as it would be when subjected to one half of the nominal compression in use. Thus for example, each half seal may be pressed to a profile intermediate between that illustrated in FIG. 8 and that illustrated in FIG. 10, with the height of the inner corrugation peaks less than that of the outer corrugation peaks. This compression can be applied for example by placing the initially pressed half-seal between two forming dies of the required profile, corresponding in particular to the grooves in which the finished seal is to be used, and compressing it to an appropriate extent.

The pressed half-deformed half-seals are then machined in the weld area, and are welded together along a circumferential weld line or lines for example as shown at 12 in FIG. 21, to form the complete sealing ring.

The welded sealing ring is fully age-hardened and then polished.

The hardened and polished sealing ring is then nickel-plated, and polished.

The nickel plating is then annealed, for example by vacuum heat treatment for about 4 hours at about 700° C.

The resulting sealing ring, when used then undergoes 50% of nominal compression, that is to say about 7-8% further compression.

It has been found that this pre-compression, or preliminary modification of the sealing ring profile, substantially eliminates scuffing and galling between the sealing ring and the grooves.

There may remain a small risk of scuffing on the radially outer surface of the sealing ring during compression, and to eliminate this, the sealing ring may have a very light coating of a suitable low-friction material at least at its outside surface or on the regions thereof liable to scuffing. Alternatively, other forms of lubrication may be provided in this region of the sealing ring.

The described method of manufacture leads to a number of significant advantages.

The contact travel of the sealing ring and the groove is effectively halved, and this reduction in travel of the groove faces over the surface of the sealing ring reduces or eliminates scuffing, galling, and failing to seal. This advantage is particularly significant when the groove and sealing ring surfaces both comprise nickel or a high-nickel composition.

During compression of the sealing ring there is a sliding action between the groove wall and the radially outer surfaces of the sealing ring, particularly in the regions identified by reference number 8 in the drawings, while, at least in the case of sealing rings having profiles similar to that shown in FIG. 1, a rolling action occurs between the inner limbs and the groove walls during compression.

Due to the aging during manufacture, the sealing ring is made stronger. Consequently, during compression the forces on the sealing ring are roughly half-way between axial and radial, whereas in a sealing ring made by welding without age hardening, and without pre-compression or pre-deformation of the half-seal profiles, the forces on the sealing ring are essentially axial.

Also due to the aging, hoop stresses during compression are increased, increasing the contact load between the inner limbs of the sealing ring and the groove walls, ensuring that the nickel coating is forced under pressure to fill any surface asperities of eh mating faces. The contact pressure is substantially greater than in the case of a sealing ring made without aging, so that the sealing performance becomes more reliable.

The enhanced rolling action at the inner limbs of the sealing ring, and reduced sliding in these regions, remove the possibility of scuffing in these regions.

Figure 31:
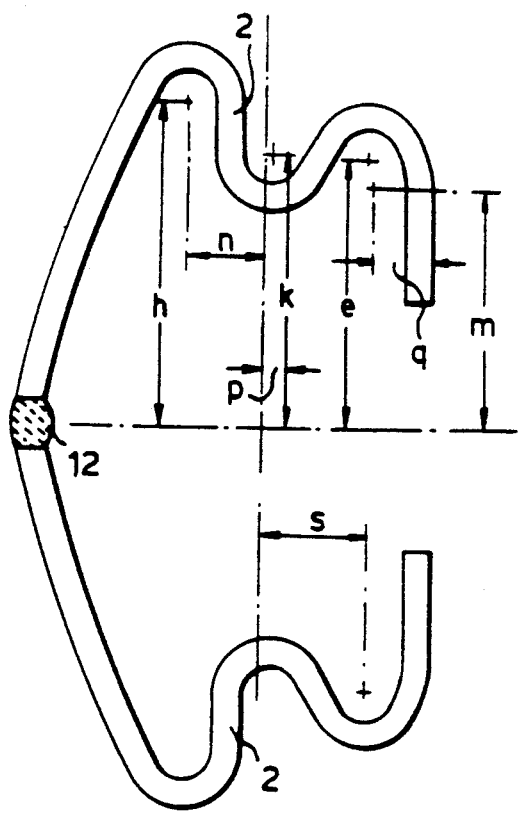
FIG. 31 illustrates a sealing ring having a modified profile in that the axial distance between the corrugation peaks adjacent the inner limbs is less than the axial distance between the corrugation peaks adjacent the outer limbs of the sealing ring.

FIG. 31 shows, by way of example only, a sealing ring having a profile generally resembling that shown in FIG. 21, but manufactured as just described and therefore having a modified profile in that the axial distance between the corrugation peaks adjacent the inner limbs is less than the axial distance between the corrugation peaks adjacent the outer limbs of the sealing ring. By way of example only this drawing shows typical dimensions in inches, clearly illustrating the extent to which the inner limbs have been axially moved towards one another, and rotated towards one another, compared with the sealing ring profile illustrated in FIG. 21.

I claim:

1. A seal assembly comprising in combination:
   first and second bodies to be sealed, each having a sealing surface and an annular groove in said surface which groove has a V-section radial profile with a radially inner side wall and a radially outer side wall which side walls converge away from the sealing surface; and a seal ring adapted to be inserted in, and to make sealing contact with said converging side walls of said V-section grooves, said seal ring comprising a resilient ring made of sheet metal and having in radial cross-section a hollow ring profile with respective axial ends, said ring profile comprising:
   a radially outer side wall region having respective axial ends;
   axially adjacent and continuous with each axial end of the outer side wall region a respective radially outer contact surface region extending obliquely inwardly towards the axis of the ring for making sealing contact with a respective radially outer side wall of a respective said V-section groove;
   in each axial end of said ring profile, a curved sinuosity continuous with said oblique contact surface region and defining an axially outwardly facing deep circumferential groove; and radially inwardly of and continuous with each said sinuosity a respective radially inner contact surface region extending obliquely inwardly towards the axis of the ring for making sealing contact with a respective said radially inner side wall of a said V-section groove;
   at each axial end of said ring profile, said radially inner and radially outer contact surface regions converging with one another in an axially outward direction; and
   the ring having in its radially inner side at least one aperture permitting communication between the hollow interior of said ring profile and the environment adjacent said radially inner side of the ring; whereby the resilience of the sheet metal seal ring provides sealing pressure between the ring and the groove side walls.

2. The assembly according to claim 1 wherein the ring further comprises, between and continuous with said inner contact surface regions, a radially inner side wall region forming a substantially closed ring profile, said at least one aperture being provided in said radially inner side wall region.

3. The assembly according to claim 1 wherein the ring has an annular gap between said inner contact surface regions constituting said aperture.

4. The assembly according to claims 1 or 2 wherein at least one of said radially outer side wall and said radially inner side wall regions is of curved cross sectional profile forming a shallow groove of arcuate concave profile.

5. The assembly according to claims 1 or 2 wherein said outer side wall region is generally convex.

6. The assembly according to claim 1 wherein said sinuosity defines, at each said axial end, a respective corrugation peak radially within and without said deep circumferential groove, the radially inner corrugation peak having a smaller axial height than the radially outer corrugation peak.

7. The assembly according to claim 1, the seal ring having been pre-compressed by an amount less than its nominal degree of compression.

8. The assembly according to claim 1 which the ring comprises of, in radial cross-section, two annular half-seal rings abutting and welded together in a plane perpendicular to the axis of the sealing ring.

9. The assembly according to claim 8, the sealing having a circumferential weld line between said half seal rings on its radially outer side and a low-friction coating at least on this weld line.

10. The assembly according to claim 1 wherein said outer side wall region is of curved cross-section profile forming a shallow groove of arcuate concave profile.

11. A seal assembly comprising in combination:
    first and second bodies to be sealed, each having a sealing surface and an annular groove in said surface which groove has a V-section radial profile with a radially inner side wall and a radially outer side wall which side walls converge away from the sealing surface; and a V-groove flange seal ring adapted to be inserted in, and to make sealing contact with said converging side walls of said V-section grooves in said bodies to be sealed, said seal ring comprising a resilient ring made sheet metal and having in radial cross-section a hollow ring profile with respective axial ends, said ring profile comprising:
    a radially outer side wall region having respective axial ends;
    axially adjacent and continuous with each axial end of the outer side wall region a respective radially outer contact surface region extending obliquely inwardly towards the axis of the ring for making sealing contact with a respective said radially outer side wall of a respective said V-section groove;
    at each axial end of said ring profile, an end wall region continuous with and radially inward of said oblique contact surface region;

and radially inwardly of and continuous with each said end wall region a respective radially inner contact surface region extending obliquely inwardly towards the axis of the ring for making sealing contact with a respective said radially inner side wall of a said V-section groove;

at each axial end of said ring profile, said radially inner and radially outer contact surface regions converging with one another in an axially outward direction;

and an inner side wall region axially between and continuous with said inner contact surface regions, at least one aperture being provided in said inner side wall region; and said outer and inner side wall regions being curved in cross-section to define respective shallow concave arcuate grooves; whereby the resilience of the sheet metal seal ring provides sealing pressure between the ring and the groove side walls.

12. A method of making a V-groove flange seal ring adapted to be inserted in, and to make sealing contact with converging walls of, V-section grooves in bodies to be sealed, said seal ring comprising a resilient ring made of sheet metal and of hollow profile in radial cross-section, said method comprising:

forming two annular half-seals each forming a respective mirror-image axial half of said ring and each shaped to have a radially outer side wall region having respective axial ends;

disposing axially adjacent and continuous with one axial end of the outer side wall region a respective radially outer contact surface region extending obliquely inwardly towards the axis of the ring for making sealing contact with a radially outer side wall of a said V-section groove;

disposing an end wall region continuous with and radially inward of said oblique outer contact surface region; and radially inwardly of and continuous with said end wall region a respective radially inner contact surface region extending obliquely inwardly towards the axis of the ring for making sealing contact with a radially inner side wall of a said V-section groove;

disposing said radially inner and radially outer contact surface regions such that they converge with one another in an axially outward direction towards said end wall region;

axially compressing each half-seal to a degree less than the nominal compression in use, and then welding the half-seals together along at least one circumferential weld line to form said hollow profile, said hollow profile having a radially inner side; and providing in the radially inner side of the thus welded ring at least one aperture permitting communication between the hollow interior of said ring profile and the environment adjacent said radially inner side of the ring.

13. The method according to claim 12 further comprising age-hardening the sealing ring after said welding.

* * * * *